United States Patent Office 3,084,055
Patented Apr. 2, 1963

3,084,055
CADMIUM PHOSPHATE GLASS
Harry W. Carpenter, Northridge, and Peter D. Johnson, Chatsworth, Calif., assignors, by mesne assignments, to the United States of America as represented by the United States Atomic Energy Commission
No Drawing. Filed Nov. 16, 1960, Ser. No. 69,537
8 Claims. (Cl. 106—52)

Our invention relates to a cadmium-containing glass, and more particularly to a method of preparing a clear and transparent cadmium phosphate glass suitable for use in radiation environments.

Cadmium has a very high thermal neutron absorption cross section and, for this reason, finds wide usage in radiation environments, such as in nuclear reactors for control purposes, in experimental physics applications such as thermal neutron measurements, and in hot cells handling radioactive materials. Many applications of cadmium are in high temperature environments above the melting or softening point of the metal and, therefore, the use of cadmium as a neutron absorber requires its incorporation in a highly stable form. For example, its use in a high density, ceramic form would be suitable for many applications. Particularly suitable and desirable would be a clear, transparent glass having no absorption peaks in the visible spectrum which could be used as a viewing window, and also as a protective coating material for tubes.

Accordingly, the principal object of our invention is to provide a method of preparing a clear, transparent, cadmium-containing glass.

Another object is to provide a method of preparing a clear, transparent, cadmium-containing glass of high cadmium density and high softening point.

Another object is to provide a method of preparing a cadmium phosphate glass of such properties.

Other objects and advantages of our invention will become apparent from the following detailed description.

In accordance with our present invention, we have developed a method of preparing a cadmium phosphate glass, which comprises providing a mixture of solid inorganic compounds of cadmium and phosphate having volatile components, and heating the resulting composition to a temperature of at least about 850° C. to yield a final composition of cadmium phosphate. A vitreous composition which is a clear, transparent glass, having no absorption peaks in the visible spectrum, is obtained in this manner. This glass contains a high cadmium concentration (at least about 41.5 weight percent cadmium) and serves as a good absorber of thermal neutrons. It can serve as a transparent window for viewing a radiation environment, as a high temperature protective coating for various materials such as porcelain tubing, and within a nuclear reactor, or exponential or critical experiment, where neutron absorption is required as for control purposes.

Cadmium phosphate glass may be made according to our invention by melting together cadmium and phosphate compounds in solid form having vaporizable components. The initial cadmium and phosphate compounds are inorganic compounds having readily vaporizable components such as $O_2$, $H_2O$, $CO_2$, $H_2$, nitrogen oxides, and $NH_3$. Thus, the cadmium is in such form as CdO, $CdCO_3$ or $CdNO_3$, and the phosphate in solid forms of an ammonium phosphate, $P_2O_5$ or $H_3PO_4$. Such powders are thoroughly mixed, as by mortaring, and placed in a crucible, such as of alumina. The powders are first heated at a relatively low temperature to drive off the volatile components, leaving a white matrix speckled with red spots. In the case of CdO and $(NH_4)_2HPO_4$, volatilization is accomplished at a temperature of about 300° C. The resulting material is then heated to a temperature of at least about 850° C., and preferably at a temperature of about 1000°–1100° C., to fuse the powders into a glassy melt. The atmosphere the heating is performed in is not critical, and ordinary air is customary. Heating in two steps, rather than one, first to drive off vaporizable components, and then to fuse the powders, is not critical, but is desirable to prevent spattering of the glass constituents in the reaction chamber.

The melt reaches equilibrium in a period of about two hours, and then is allowed to cool to room temperature by air-cooling. Particularly if subsequent working of the glass is contemplated, we find that slow cooling, for example at the rate of 100°–200° C. per hour, is desirable to relieve any residual stresses. The result is a clear, stable glass having a softening point of about 800° C. A fine quality cadmium metaphosphate glass having the chemical formula of either $Cd(PO_3)_2$ or $CdO \cdot P_2O_5$ is obtained under the above conditions by reacting the cadmium and phosphate constituents in a mole ratio of about 1:2. To obtain glass with a higher cadmium concentration, of about the formula $Cd_3P_4O_{13}$, the above mole ratio is changed to 3:2.

To improve the workability of the glass, as in glassblowing, and to decrease any tendency to devitrify, we find that up to about 4 weight percent of the ceramic oxides $Al_2O_3$ or $SiO_2$ can be incorporated in the initial glass components. About 2 weight percent of the additive is optimum, and we find that the $SiO_2$ is the preferred additive.

In a preferred embodiment of our invention, CdO and $(NH_4)_2HPO_4$ in a mole ratio of about 1:2 are heated together at a temperature of about 300° C. to drive off ammonia and water. The resulting composition is then heated at a temperature of about 1100° C. in air for about two hours to fuse the composition into a molten cadmium metaphosphate glass. This composition is slowly cooled to room temperature to yield a clear, transparent glass having a high cadmium density.

The following examples are offered to illustrate our invention in greater detail.

Example I

One mole of CdO and 2 moles of $(NH_4)_2HPO_4$ in powder form were mortared together and placed in an alumina crucible. The ammonia and $H_2O$ gases were driven off at a temperature of about 300° C., leaving a white matrix speckled with red spots. The material was then heated to 1075° C. and allowed to mix and reach equilibrium for a period of about two hours. The temperature was then dropped to about 1000° C. and the molten glass poured into graphite molds preheated to about 300° C. to prevent thermal shock to the mold and glass. A clear, stable glass was formed, having a softening point of about 800° C. Light transmission tests showed no absorption in the wavelength range 0.35–2.8 millimicrons.

Example II

A glass of the ratio $1.5CdO:1P_2O_5$ was obtained by heating CdO and $(NH_4)_2HPO_4$ powders together after mortaring. The powders were heated in an alumina crucible at a temperature of about 300° C. to drive off the ammonia and $H_2O$ gases. The resulting composition was heated at a temperature of about 1100° C. to melt the powders, and the homogeneous melt obtained after heating for 1½ hours was poured into a graphite mold preheated to about 300° C. On cooling, a clear glass of the molecular formula $Cd_3P_4O_{13}$ was formed. Light transmission tests as in Example I indicated no absorption.

*Example III*

The same as Examples I and II, except that about 2 weight percent $SiO_2$ was added to the initial powder mixtures. The resulting glasses displayed improved workability in glassblowing over similar glasses without the $SiO_2$ addition.

The above examples are illustrative rather than restrictive of our invention, which should be understood to be limited only as is indicated in the appended claims.

We claim:

1. A method of preparing a cadmium phosphate glass which comprises providing a mixture consisting essentially of solid inorganic compounds of cadmium and phosphate having vaporizable compfionents, in a cadmium:phosphate mole ratio of about 1:2 to 3:2, and heating the resulting composition to a temperature of at least about 850° C. to yield a cadmium phosphate glass.

2. The method of claim 1, wherein said heating is at a temperature of about 1000°–1100° C. until a homogeneous, vitreous melt is obtained.

3. A method of preparing a cadmium phosphate glass which comprises providing a mixture consisting essentially of solid inorganic compounds of cadmium and phosphate having volatile components in a cadmium:phosphate mole ratio of about 1:2 to 3:2, selected from the group consisting of $O_2$, $H_2O$, $CO_2$, $H_2$, nitrogen oxides, and $NH_3$, heating said mixture to drive off said volatile components, and then heating the resulting composition at a temperature of about 1000°–1100° C. to obtain a cadmium phosphate glass.

4. A method of preparing a cadmium phosphate glass which comprises providing a mixture consisting essentially of a cadmium compound selected from the group consisting of CdO, $CdCO_3$ and $CdNO_3$, and an ammonium phosphate compound, in a cadmium:phosphate mole ratio of about 1:2 to 3:2, and heating said mixture to a temperature of at least about 850° C. to obtain a cadmium phosphate glass.

5. The method of claim 4, wherein said mixture is first heated to a relatively low temperature to drive off vaporizable components, and then to about 1000°–1100° C. to obtain a vitreous melt.

6. The method of claim 4, wherein up to approximately 4 weight percent of a ceramic oxide selected from the group consisting of $SiO_2$ and $Al_2O_3$ is added to said mixture.

7. A method of forming a cadmium metaphosphate glass which comprises providing a mixture consisting essentially of CdO and an ammonium phosphate compound in a mole ratio of about 1:2, heating the mixture in air at about 300° C. to drive off vaporizable components, and then heating the resulting composition to a temperature of about 1000°–1100° C. for about two hours.

8. The method of claim 7, wherein approximately 2 weight percent of $SiO_2$ is added to said mixture.

References Cited in the file of this patent

UNITED STATES PATENTS 2,532,386    Armistead _____ Dec. 5, 1950

FOREIGN PATENTS 476,945    Great Britain _____ Dec. 20, 1937